US007004136B2

(12) United States Patent  (10) Patent No.: US 7,004,136 B2
Garabello et al.  (45) Date of Patent: Feb. 28, 2006

(54) SYSTEM FOR TRANSMITTING DRIVE FROM THE CRANKSHAFT OF AN INTERNAL COMBUSTION ENGINE OF A MOTOR VEHICLE TO A GROUP OF AUXILIARY DEVICES

(75) Inventors: Marco Garabello, Turin (IT); Domenico Mesiti, Leini' (IT); Dario Caenazzo, Scalenghe (IT)

(73) Assignee: C.R.F. Societa Consortile Per Azioni, Orbassano (IT)

( * ) Notice: Subject to any disclaimer, the term of this patent is extended or adjusted under 35 U.S.C. 154(b) by 0 days.

(21) Appl. No.: 10/825,666

(22) Filed: Apr. 16, 2004

(65) Prior Publication Data

US 2004/0261753 A1    Dec. 30, 2004

(30) Foreign Application Priority Data

Apr. 18, 2003    (IT)    ............................ TO2003A0311

(51) Int. Cl.
*F02N 11/04*  (2006.01)
(52) U.S. Cl. ...................... 123/179.28; 74/7 C; 290/31
(58) Field of Classification Search ............. 123/179.3, 123/179.4, 179.28, 179.25, 179.26; 74/7 C; 290/22–25, 31, 34
See application file for complete search history.

(56) References Cited

U.S. PATENT DOCUMENTS

| 6,501,190 | B1 |   | 12/2002 | Seguchi et al. |
|---|---|---|---|---|
| 6,793,059 | B1 | * | 9/2004 | Okada et al. ............... 192/84.1 |
| 2003/0224903 | A1 | * | 12/2003 | Kitamura et al. .............. 477/5 |

FOREIGN PATENT DOCUMENTS

| DE | 30 11 949 A | 11/1981 |
|---|---|---|
| EP | 1 207 298 A | 5/2002 |
| EP | 1 270 293 A | 1/2003 |
| GB | 2 085 381 A | 4/1982 |

\* cited by examiner

*Primary Examiner*—Andrew M. Dolinar
(74) *Attorney, Agent, or Firm*—Sughrue Mion, PLLC

(57) ABSTRACT

The system includes at least one transmission belt operable to couple the drive shafts of auxiliary devices with a pulley operatively connectable to the crankshaft of the internal combustion engine, and a servo controlled clutch operable selectively to control the coupling of the pulley with the crankshaft of the internal combustion engine. Between the pulley and the crankshaft of the engine is interposed an overrun clutch such that when the angular velocity of the crankshaft is greater than and, respectively, less than that of the pulley, the pulley is able to be driven in rotation by the crankshaft and, respectively, becomes freely rotatable with respect to this crankshaft. The servo controlled clutch is normally de energised and disengaged. The system further includes control devices for causing energisation and engagement of the servo controlled clutch and activation of the machine as a motor, whilst the internal combustion engine is not running, in order to restart the motor by means of the electric machine operating as a motor.

4 Claims, 1 Drawing Sheet

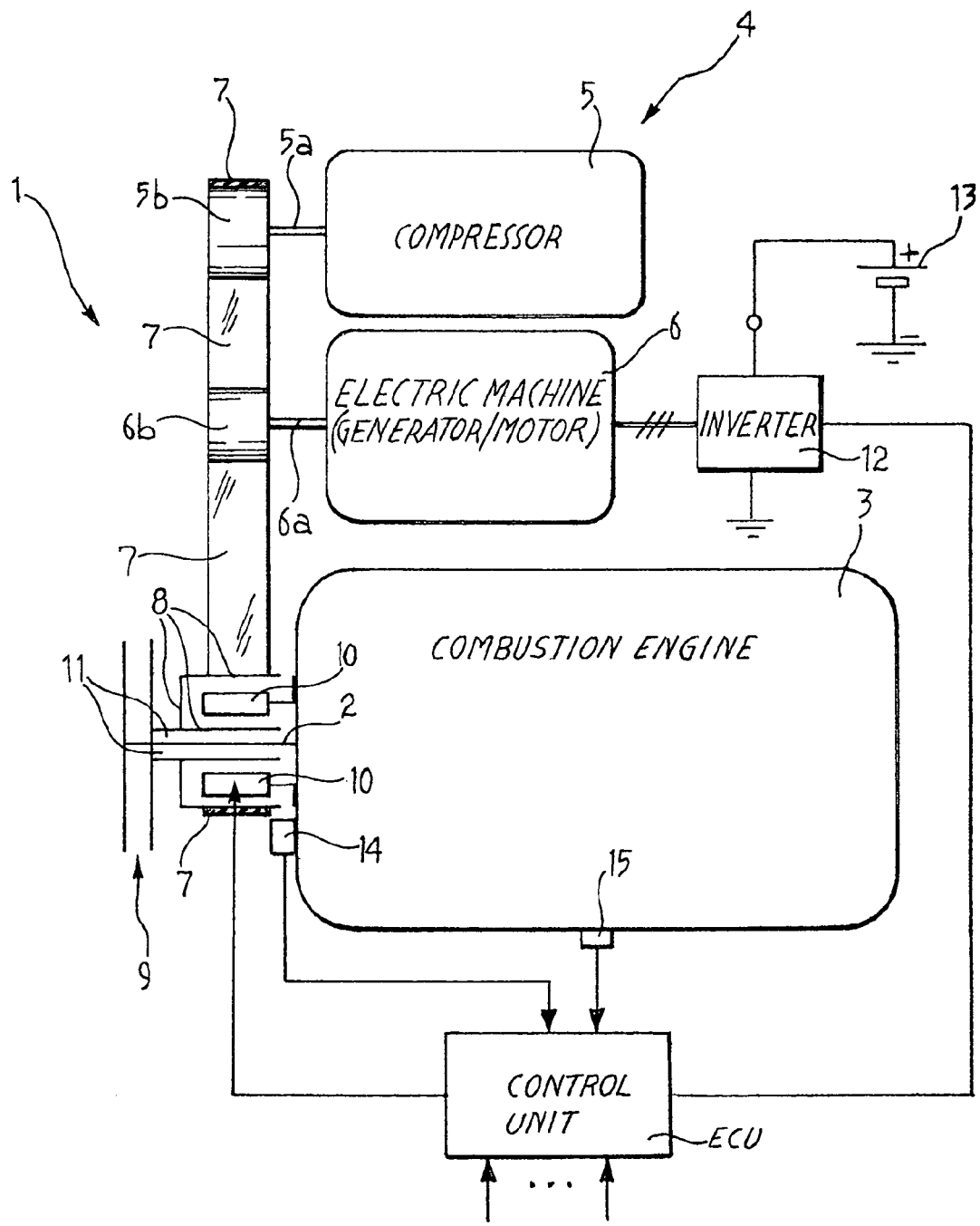

SYSTEM FOR TRANSMITTING DRIVE FROM THE CRANKSHAFT OF AN INTERNAL COMBUSTION ENGINE OF A MOTOR VEHICLE TO A GROUP OF AUXILIARY DEVICES

BACKGROUND OF THE INVENTION

The present invention relates to a system for transmitting drive between the engine crankshaft of an internal combustion engine of a motor vehicle and a group of auxiliary devices provided with respective drive shafts and including an electric machine operable to function selectively as a generator and a motor.

More specifically, the subject of the invention is a transmission system of the type comprising
- at least one belt acting to couple the drive shafts of the said auxiliary devices with a pulley operatively connectable to the crankshaft of the internal combustion engine, and
- a servo controlled clutch operable selectively to control coupling of the said pulley with the crankshaft of the internal combustion engine.

A drive transmission system of this type is known, with an electromagnetically controlled clutch which is normally excited and engaged to couple the said pulley to the crankshaft for rotation with the internal combustion engine. This known system makes it possible to achieve the following functions or operative conditions:
- activation of the auxiliary devices (compressor of the air conditioning system, electric machine functioning as generator etc) whilst the internal combustion engine is running; the electromagnetically controlled clutch is excited and engaged;
- activation of the auxiliary devices, and in particular of the compressor of the air conditioning system, whilst the internal combustion engine is not running; in this case the electromagnetically controlled clutch is de-excited, and therefore disengaged, and the said electric machine is made to operate as a motor to drive the compressor in rotation by means of the said transmission belt; and
- re-starting of the internal combustion engine (hot) by means of the said electric machine, by operating as a motor, for example to achieve a so-called stop-start function; in this case the electromagnetically controlled clutch is excited and engaged to couple the said electric machine to the crankshaft of the internal combustion engine in the re-starting phase.

The known system described above has the disadvantage of requiring that the electromagnetic clutch remains permanently energised when the internal combustion engine is running. The prolonged energisation of this clutch involves a high consumption of electrical energy which negatively influences the overall energy balance.

SUMMARY OF THE INVENTION

One object of the present invention is to provide a drive transmission system of the above-specified type, which makes it possible to overcome this disadvantage.

This, and other objects are achieved according to the invention with a drive transmission system of the above-specified type, characterised
- by the fact that between the said pulley and the crankshaft of the internal combustion engine there is interposed a "free wheel" clutch such that when the angular velocity of the crankshaft of the internal combustion engine is greater than or, respectively, less than, that of the said pulley, the pulley is capable of being driven in rotation by the crankshaft of the internal combustion engine or, respectively, becomes freely rotatable with respect to the said crankshaft; and
- by the fact that the servo controlled clutch, interposed between the crankshaft of the internal combustion engine and the said pulley, is normally de-energised and disengaged;
- the system, moreover, includes control means arranged to cause energisation and engagement of the said servo controlled clutch and activation of the said electric machine whilst the internal combustion engine is not running, to re-start the internal combustion engine by means of the said electric machine operating as a motor.

Further characteristics and advantages of the invention will become apparent from the following detailed description, given purely by way of non-limitative example, with reference to the attached drawings, which show a schematic representation of a drive transmission system according to the present invention.

BRIEF DESCRIPTION OF THE DRAWINGS

In the drawing a drive transmission system according to the invention is generally indicated 1, for transmitting motion between the crankshaft 2, of an internal combustion engine 3, of a motor vehicle (not shown) and a group of auxiliary devices generally indicated 4.

DETAILED DESCRIPTION OF THE INVENTION

In the exemplary embodiment illustrated this group of auxiliary devices 4 comprises a compressor 5, for an air conditioning system of the motor vehicle passenger compartment, and a reversible electric machine 6, operable to function selectively as a generator and an electric motor. This electric machine 6 is, for example, a three-phase asynchronous machine.

The auxiliary devices 5 and 6 are provided with respective drive shafts 5a and 6a, on which are fitted respective pulleys 5b and 6b.

With reference to FIG. 1, the transmission system 1 comprises at least 1 transmission belt 7 which couples the pulley 5b and 6b of the auxiliary devices 5 and 6 for rotation with a pulley 8 operatively connectable to the crankshaft 2 of the internal combustion engine 3 in the ways which will be described hereinbelow.

A friction clutch for example of the electromagnetically controlled type, is indicated 9, and acts to control the coupling between the pulley 8 and the crankshaft 2 of the internal combustion engine 3 selectively. In the embodiment shown by way of example in the drawing this clutch 9 comprises an excitation winding 10 of annular form disposed about the axis of the crankshaft after 2 of the internal combustion engine 3, and fixed to the engine 3.

As is schematically illustrated in FIG. 1, between the pulley 8 and the crankshaft 2 of the internal combustion engine 3 is interposed an overrun clutch 11 (a so-called "free wheel" clutch) this overrun clutch 11 is formed in such a way that when the angular velocity of the crankshaft 2 of the internal combustion engine 3 is greater and, respectively, less than that of the pulley 8, this pulley 8 is capable of being driven to rotate by the crankshaft 2 and, respectively, becomes freely rotatable with respect to this crankshaft.

The clutch 9, which is interposed between the crankshaft 2 of the internal combustion engine and the pulley 8, is normally de-excited and disengaged.

The system 1 further includes a control unit ECU arranged to cause excitation of the winding 10 and the consequent engagement of the clutch 9 and activation of the electric machine 6 as a motor, when the internal combustion engine 3 is not running, that is for the purpose of hot starting the engine by means of the electric machine 6 operating as a motor.

For this purpose the control unit ECU is arranged for example to pilot a controlled bridge inventor circuit 12 (FIG. 1) connected to the electric machine 6 and to a rechargeable dc voltage source such as a battery 13.

The unit ECU is conveniently also connected to a sensor 14 able to provide it with signals indicative of the speed of rotation of the crankshaft 2 of the internal combustion engine 3 and a sensor 15 operable to provide it with signals indicative of the temperature of this engine.

The drive transmission system 1 described above with reference to FIG. 1 operates essentially in the following manner.

When the internal combustion engine 3 is running the clutch 9 is deenergised and disengaged. It therefore consumes no energy.

In this condition the pulley 8 is capable of being driven to rotate by the crankshaft 2 of the internal combustion engine 3 by means of the overrun clutch 11. Rotation of the pulley 8 by means of the belt 7 causes rotation of the auxiliary devices 5 and 6. The electric machine 6 in particular can operate as a generator to recharge the battery 13.

When the internal combustion engine 3 is not running the pulley 8 is in fact uncoupled from rotation by the shaft 2 of this engine, and the control unit ECU can cause actuation, if required, of the compressor 5 of the air conditioning system by making the electric machine 6 operate as an electric motor (via the inverter 12). The torque is transmitted from the drive shaft 6a of the electric machine 6 to the drive shaft 5a of the compressor 5 by means of the belt 7 and the pulley 8 which is released from rotation with the crankshaft 2 of the internal combustion engine. The clutch 9 remains de energised and disengaged in these conditions.

The control unit ECU can control engagement of the clutch 9 and coupling of the crankshaft 2 for rotation with the engine 3 to the pulley 8 when it is necessary to restart the internal combustion engine 3 hot, without resource to the specific electric starter motor, for example to achieve a so-called stop-start functioning mode for minimisation of fuel consumption and emissions. Once clutch 9 is excited and engaged the control unit ECU causes functioning of the electric machine 6 as an electric motor so as to drive the crankshaft 2 of the internal combustion engine 3 into rotation by means of the belt 7 and the pulley 8.

The system described above has the advantage of achieving an automatic coupling between the crankshaft of the internal combustion engine and the transmission belt 7 as soon as the speed of rotation of the engine 3 exceeds the speed of rotation of the pulley 8.

The use of the clutch 9 is limited solely to the function of hot starting the internal combustion engine.

When the internal combustion engine is running the clutch 9 is de-energised and disengaged, and consumes no energy.

This clutch 9 is moreover conveniently dimensioned only in relation to the torque necessary to achieve hot staring of the internal combustion engine, and this component is therefore relatively economical.

According to a possible alternative, not illustrated, the clutch 9 could be of the electro hydraulic controlled type.

Naturally, the principle of the invention remaining the same, the embodiments and details of construction can be widely varied with respect of what has been described and illustrated purely by way of non-limitative example, without by this departing from the scope of the invention as defined in the appended claims.

What is claimed is:

1. A device transmission system between the crankshaft of an internal combustion engine of a motor vehicle and a group of auxiliary devices provided with respective drive shafts and including an electric machine operable to function selectively as a generator and a motor;

the system including at least one transmission belt operable to couple the drive shafts of the said auxiliary devices with a pulley operatively connectable to the crankshaft of the internal combustion engine; and a servo controlled clutch operable selectively to control the coupling of the said pulley with the crankshaft of the internal combustion engine;

wherein between the said pulley and the crankshaft of the internal combustion engine is interposed an over-run clutch such that when the angular velocity of the crankshaft of the internal combustion engine is greater and, respectively, less than that of the said pulley, said pulley is capable is being driven to rotate by the crankshaft of the internal combustion engine and, respectively, becomes freely rotatable with respect to the said crankshaft;

the servo controlled clutch, interposed between the crankshaft of the internal combustion engine and the said pulley being normally disengaged and de energised;

the system further including control means arranged to cause energisation and engagement of the said servo controlled clutch and activation of the said electric machine as a motor, whilst the internal combustion engine is not running, to restart the internal combustion engine by means of the said electric machine operating as a motor.

2. A drive transmission system according to claim 1, in which the said electric machine is a polyphase asynchronous machine, and the said control means comprise a controlled inverter connected to the said electric machine and a rechargeable source of DC voltage.

3. A drive transmission system according to the claim 1, in which the said servo controlled clutch is of the electromagnetically controlled type.

4. a drive transmission system according to the claim 1, in which the said servo controlled clutch is of the electrohydraulically controlled type.

* * * * *